United States Patent [19]

Chamran et al.

[11] 3,767,939

[45] Oct. 23, 1973

[54] DYNAMIC FILTER

[75] Inventors: Morteza M. Chamran, Elmhurst; Sang S. Pak, Villa Park, both of Ill.

[73] Assignee: The Perkin-Elmer Corporation, Oak Brook, Ill.

[22] Filed: Dec. 29, 1971

[21] Appl. No.: 213,256

[52] U.S. Cl. .................. 307/251, 307/246, 307/293, 328/167, 328/132

[51] Int. Cl. ...................... H03k 17/60, H04b 15/00

[58] Field of Search .................... 307/246, 293, 295, 307/290, 251; 328/167, 132

[56] References Cited

UNITED STATES PATENTS

| | | | |
|---|---|---|---|
| 3,628,057 | 12/1971 | Mueller | 328/167 X |
| 3,638,037 | 1/1972 | McMurtrie | 328/167 X |
| 2,995,668 | 8/1961 | Sharaf | 307/290 X |
| 3,380,003 | 4/1968 | Bemmann | 307/290 X |
| 3,414,735 | 12/1968 | Harris et al. | 307/293 X |
| 3,621,286 | 11/1971 | Varrasso | 307/246 X |
| 3,691,405 | 9/1972 | Kendell | 307/295 |

*Primary Examiner*—John S. Heyman
*Attorney*—Molinare, Allegretti et al.

[57] ABSTRACT

The disclosure describes a system for automatically controlling the time constant of an electronic filter to significantly alter the transition time from one signal response level to another. The system employs a variable impedance means, such as a field effect transistor, which can alter the effective time constant of the filter. Sensor means sample the imput signal to the filter and produce a control signal in response to an amount and rate of change in the input signal greater than a predetermined value. Control means, such as a polarity changing inverter and a diode gating network, energize the field effect transistor in response to either polarity of the control signal, so that the time constant of the filter is changed.

10 Claims, 3 Drawing Figures

INVENTORS
MORTEZA CHAMRAN
BY & SANG S. PAK
Moliniare, Allegretti Newitt & Witcoff
ATTORNEYS

DYNAMIC FILTER

BACKGROUND OF THE INVENTION

This invention relates to filters and more specifically relates to systems for automatically changing the time constant of a filter.

Experience has shown that there is a need for an electrical device capable of operating in a mode which produces an output signal that is insensitive to noise associated with input signals while at one range of values, while it can follow rapidly a change of the input signals to another range of values. For example, the output signal of the device could be normally constant in spite of noise and other spurious signal level changes generated in the device, but could rapidly respond to intentional changes in the signal level designed to alter the operation of the device. There is a need for such a device in measuring instruments which indicate a reading corresponding to an input of measured signal by means of a readout system incorporating a meter or digital display. For many applications, such a measuring instrument must operate in the presence of noise signals that appear together with the measured signal.

The noise signals create a design dilemma which is normally difficult to overcome. For example, if the time constant of the readout system is relatively long, the noise signals will be averaged out, and a steady, constant output reading will result. However, the response of the instrument to any intentional change in the measured signal will take a period of time much longer than desired. As a result, the operator of the instrument will have to wait to annoyingly long period of time in order to read the intentional change in the measured signal. On the other hand, if the time constant of the readout system is relatively short, the output reading will change rapidly with an intentional change in the measured signal level, but the reading will continually fluctuate (or a digital readout will constantly change its last digit) in response to the noise signals introduced into or generated in the instrument. The constant fluctuation, of course, will be annoying to the operator who is trying to record the value of the output reading.

Devices having the mode of operation described above are also valuable for use in DC servo systems. In such systems, it is desirable to have a slave member which is insensitive to noise or spurious signals introduced into the system during steady state periods of operation, but which can achieve a high slewing rate when an input signal is intentionally changed to a new level. For example, in a motor-driven feed screw machine, the feed screw must rapidly attain a new screw position and then hold the position despite the presence of noise signals in the system.

SUMMARY OF THE INVENTION

In order to overcome the deficiencies of the prior art devices, the applicants have invented a system for automatically controlling the time constant of a filter which could be employed in systems of the foregoing general types.

According to a principal feature of the invention, a variable impedance means, such as a field effect transistor, is connected to the filter. Sensor means are arranged to sample the input signal to the filter and to produce a control signal in response to a change or rate of change in the input signal greater than a predetermined value. Control means are employed for energizing the variable impedance means in response to the control signal so that for either polarity of control signal the time constant of the filter may be changed.

The advantages of using the foregoing system are at once apparent. In a readout system of the type previously described, an embodiment of the invention may be arranged so that the filter normally has a long time constant. In this mode of operation, any noise signals present in the system will be averaged out so that the resulting output reading will remain relatively constant. However, when an intentional change in the input signal occurs in either direction, the sensor means detects the change, and the control means energizes the variable impedance means to reduce the time constant of the filter during the change. As a result, the intentional change in the input signal level is immediately transmitted to the indicating meter or digital display to instantaneously provide the operator with an updated output reading.

According to the same principles, the invention may also be applied to a DC servo system.

Of course, the invention also may be operated in an inverse fashion so that low level changes are transmitted to the output, whereas large changes in signal level such as unwanted transients are not transmitted to the output.

According to another feature of the invention, an input signal varying according to a known cyclical pattern which would adversely affect time constant control may be altered to provide a constant signal to the filter through the use of an automatic sample and hold circuit. The circuit preferably comprises a means for generating a phased sampling signal corresponding to a particular phase component of the input signal. The sampling signal is coacted with the input signal to select the particular component from the input signal which will be held for use as a smoothed input signal. As a result, the output of the system remains free from anomalous fluctuations in spite of the presence of particular undesired cyclical components in the input signal.

DESCRIPTION OF THE DRAWING

These and other advantages and features of the present invention will hereinafter appear for purposes of illustration, but not of limitation, in connection with the accompanying drawing wherein like numbers refer to like parts throughout, and wherein.

DESCRIPTION OF THE PREFERRED EMBODIMENTS

Figures 1, 2, 3:
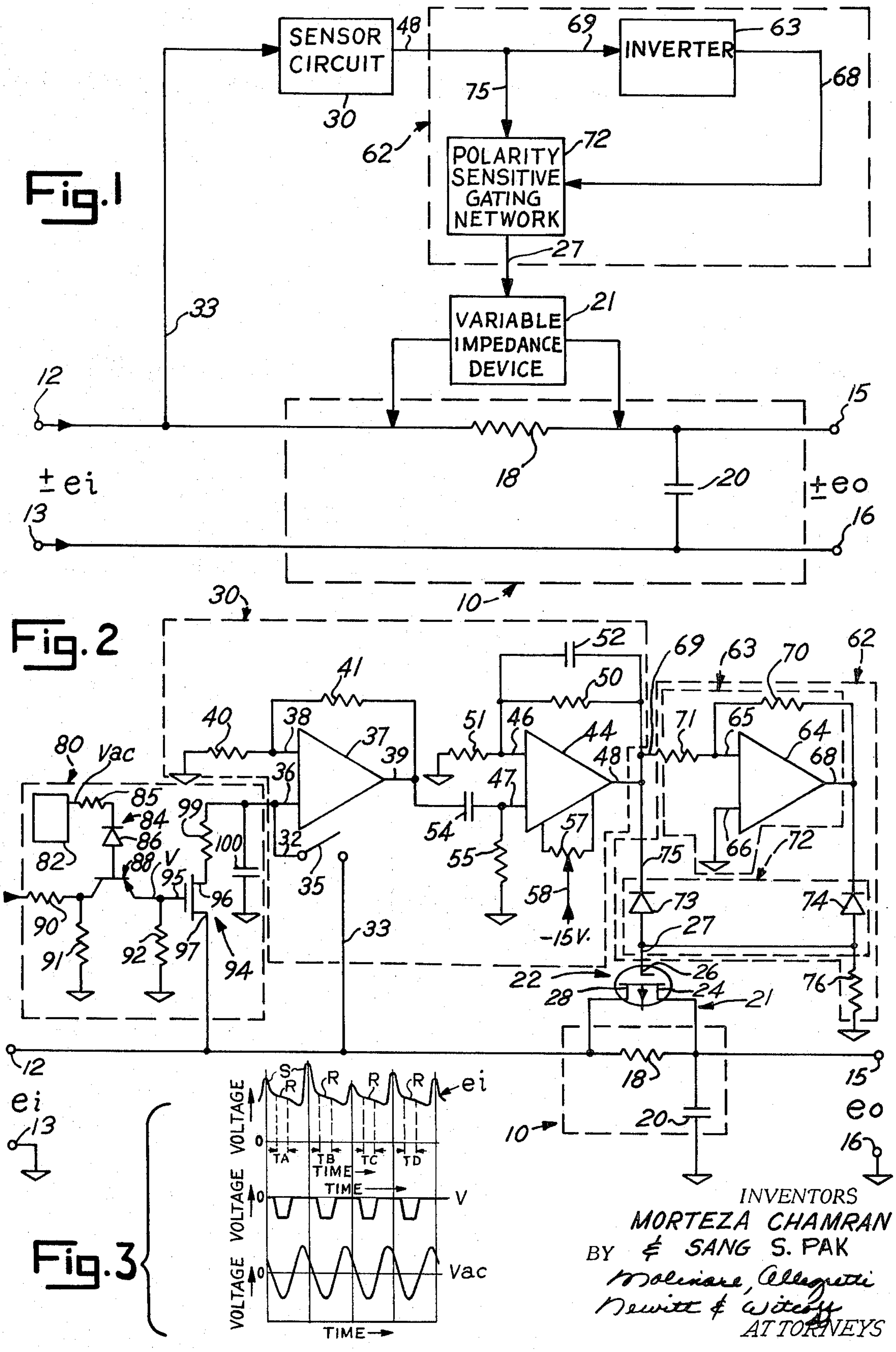
FIG. 1 is an electrical block diagram of a preferred form of apparatus made in accordance with the present invention.
FIG. 2 is a more detailed electrical schematic drawing of the apparatus shown in FIG. 1, together with an electrical schematic drawing of a preferred form of sample and hold circuit which may be used in connection with the preferred embodiment.
FIG. 3 is a diagram of the approximate voltage waveforms generated at certain points in the apparatus.

Referring to FIG. 1, the preferred form of the present invention is designed to operate in association with an exemplary filter, such as low pass filter 10, having input terminals 12, 13 and output terminals 15, 16. The filter comprises a resistor 18 and a capacitor 20 connected as shown. Terminals 12, 13 are adapted to receive an input or measured signal ei, and terminals 15, 16 are adapted to transmit an output signal eo.

Referring to FIG. 1, a preferred form of the present invention adapted to operate in connection with filter 10 basically comprises a variable impedance device 21, a sensor circuit 30, and control circuit 62.

The control circuit more specifically comprises an inverter 63 and a polarity sensitive gating network 72.

Referring to FIG. 2, the apparatus shown in block diagram form in FIG. 1 is more specifically described. As shown in FIG. 2, variable impedance device 21 comprises a field effect transistor 22 having a drain 24, a gate 26 that is connected to a conductor 27, and a source 28.

Sensor circuit 30 comprises conductors 32 and 33 that are joined by a movable switch 35 as shown. The sensor circuit also comprises an amplifier 37 having input terminals 36, 38 and an output terminal 39. The amplifier is connected through a resistor 40 to ground, and is connected to a feedback resistor 41 as shown. Sensor circuit 30 further comprises an amplifier 44 having input terminals 46, 47 and an output terminal 48. The amplifier is further connected to resistors 50, 51 and a capacitor 52 as sown. Input 47 of amplifier 44 is further connected to a capacitor 54 and a resistor 55 which serve to differentiate the electrical signal appearing on output terminal 39. Amplifier 44 is further conditioned by a potentiometer 57 comprising a sliding arm 58. Arm 58 is connected to a −15 volt supply as shown in the drawing.

Control circuit 62 comprises an inverter 63 and a polarity sensitive gating network 72.

Inverter 63 more specifically comprises an amplifier 64 having input terminals 65, 66 and an output terminal 68. Inverting input terminal 65 is connected through a resistor 71 and a conductor 69 to output terminal 48. Terminals 65 and 68 are joined by a feedback resistor 70.

Amplifiers 37, 44 and 64 may be type 741C integrated circuit amplifiers which are available from a number of sources. Each of these amplifiers is connected to a +15 volt supply and a −15 volt supply which are not shown.

Gating network 72 comprises diodes 73, 74 that are connected as shown. Diode 73 is connected by a conductor 75 to output terminal 48. The anodes of diodes 73 and 74 are each connected through a resistor 76 to ground potential.

The above-described apparatus operates in the following manner. Assuming that input signal ei is a normally DC signal, switch 35 is moved to its closed position, so that conductors 32 and 33 are joined. In this mode of operation, diodes 73 and 74 are normally nonconducting, thereby biasing transistor 22 into its nonconducting state. As a result transistor 22 has a relatively high impedance between its source and drain terminals, and the time constant of filter 20 is relatively long.

Potentiometer 57 is arranged so that changes in input signal ei having less than a predetermined magnitude will not result in any change in signal level at output terminal 48 of amplifier 44. As a result, when relatively low level noise or other spurious signals appear at terminal 12, transistor 22 remains biased in its nonconducting state, and the time constant of filter 10 remains long. This mode of operation eliminates most components of the noise signal, so that the voltage level of output signal eo remains constant.

Changes in signal ei are continuously amplified by amplifier 37 and differentiated through the operation of resistor 55 and capacitor 54. When either the change or rate of change is greater than the threshold level established by potentiometer 57, the differentiated (rate) signal is amplified in amplifier 44 and produces a control signal level having either a plus or minus polarity at output terminal 48. If the control signal level is of minus polarity at output terminal 48, diode 73 is forward biased, which, in turn, biases transistor 22 to its conducting state. If the control signal level at output terminal 48 is of plus polarity the resulting signal is amplified and inverted in amplifier 64 to produce an inverted signal that forward biases diode 74, thereby switching transistor 22 to its conducting state. In either case, irrespective of whether the voltage on output terminal 48 goes plus or minus, the gating signal produced by gating network 72 switches transistor 22 to its conductive state in order to decrease the time constant of filter 10. As soon as the time constant of filter 10 is decreased, any change in the level of input signal ei immediately results in a comparable change in the level of output signal eo.

Applicants have also found that the preferred embodiment may be used in connection with an input signal ei which has a periodic fluctuation having a predetermined frequency. Referring to FIG. 3, if input signal ei is generated by a chopper amplifier, the resulting signal ei may have a considerable relatively steady ripple component R on which are superimposed variable spike components S even after passing through a preliminary filter. If this voltage were immediately applied to amplifier 37, difficulty might be experienced, since the rectified variable components in the ripple voltage may be sufficient to cause transistor 22 to be erratically switched to its conducting state causing fluctuations due to transistor bias drop to appear in the output eo. This difficulty may be eliminated by utilizing the sample and hold circuit 80 shown in FIG. 2.

More specifically, circuit 80 comprises an AC generator 82 that generates a sampling signal Vac (FIG. 3) which is in phase with and has the same frequency as the desired steady ripple signal components R of input signal ei. Generator 82 may be synchronized with component R by well-known means. Circuit 80 further comprises a rectifying circuit 84 having a resistor 85 and diode 86 connected to the base of a pulse-forming junction transistor 88 as shown. Transistor 88, in turn, is biased by resistors 90, 91, and 92. Resistor 90 is connected to −15 volt supply. The emitter of transistor 88 is connected to the gate 95 of a field effect gating transistor 94. Transistor 94 also comprises a drain 96 and a source 97 that is connected to terminal 12. The output of transistor 94 is connected through resistor 99 to input terminal 36. A capacitor 100 is connected from input terminal 36 to ground potential.

Assuming switch arm 35 is open, circuit 80 operates in the following manner. The sampling signal Vac generated by generator 82 is rectified by diode 86 and is amplified by transistor 88 to produce a series of pulses V (FIG. 3) of the desired phase and frequency. The resulting pulse signal V appearing on the emitter of transistor 88 is applied to gate 95 to switch on the transistor 94. The relationship between pulses V and input signal ei is shown by the dotted line time period TA, TB, TC and TD. Time periods TA-TD represent the time during which a signal is transmitted through transistor 94. Transistor 94 thus passes only the desired phase component of the input signal as a series of DC pulses from which the undesired components of the input signal have been extracted. This extracted signal is then transmitted through resistor 99 and is stored on capacitor 100. Accordingly to this mode of operation, the unsteady ripple components of the input signal do not affect the operation of amplifier 44 or transistor 22.

Those skilled in the art will recognize that the preferred embodiments shown herein are merely exemplary of the preferred practice of the invention, and that various alterations and modifications of these embodiments may be made without departing from the spirit and scope of the invention.

What we claim is:

1. In a system comprising a filter having an input terminal adapted to receive an input signal and an output terminal, improved apparatus for changing the time constant of the filter comprising:

variable impedance means connected to the filter;

sensor means for producing a control signal in response to a change or rate of change in the amplitude of the input signal greater than a predetermined value, the control signal being produced only during said change or rate of change in the amplitude greater than the predetermined value ; and control means for energizing the variable impedance means in response to the control signal, whereby the time constant of the filter is changed.

2. Apparatus, as claimed in claim 1, wherein the variable impedance means comprises field effect transistor.

3. Apparatus, as claimed in claim 1, wherein the sensor means comprises means for differentiating the input signal.

4. Apparatus, as claimed in claim 1, wherein the control means comprises:

means for inverting the control signal to produce an inverted signal; and gating means for producing a gating signal in response to the inverted and control signals.

5. In a system comprising a filter having an input terminal adapted to receive an input signal and also having an output terminal, improved apparatus for changing the time constant of the filter comprising:

variable impedance means connected to the filter;

sensor means for producing a control signal in response to a change or rate of change in the input signal greater than a predetermined value;

control means for energizing the variable impedance means in response to the control signal, whereby the time constant of the filter is changed;

means for generating a sampling signal corresponding to a component of the input signal having a predetermined phase and frequency;

means for coacting the sampling signal with the input signal to extract said component from the input signal; and means for transmitting the extracted signal to the sensor means.

6. Apparatus, as claimed in claim 5, wherein the means for coacting comprises:

a pulse forming means driven by the means for generating for producing a pulse signal; and a gating device having at least a first terminal responsive to the pulse signal, a second terminal responsive to the input signal, and a third terminal connected to a capacitor and the sensor means.

7. A system for filtering in input signal comprising:

filter means for filtering the input signal to produce a filtered output signal;

an input signal path for conducting the input signal to the filter means;

an output signal path for conducting the output signal away from the filter means;

variable impedance means connected to the filter means for producing a first impedance in response to a first energizing signal so that the filter means has a first time constant and for producing a second impedance different from the first impedance in response to a second energizing signal so that the filter means has a second time constant; and sensor control means operatively connected between the input signal path and the variable impedance means for normally transmitting the first energizing signal to the variable impedance means so that the filter has the first time constant and for transmitting the second energizing signal to the variable impedance means only during an input signal change exceeding a predetermined magnitude and having a rate of change within a predetermined range of values, so that the filter switches to the second time constant only during said input signal change, and thereafter reverts to the first time constant.

8. Apparatus, as claimed in claim 7, wherein the variable impedance means comprises a field effect transistor having a gate to which the first and second energizing signals are transmitted.

9. Apparatus, as claimed in claim 7, wherein the sensor control means comprises means for differentiating the input signal.

10. Apparatus, as claimed in claim 7, wherein the sensor control means is connected in parallel with the input signal path.

* * * * *